(Model.)

S. M. WALCHER.
WASHING MACHINE.

No. 350,175. Patented Oct. 5, 1886.

2 Sheets—Sheet 1.

WITNESSES

INVENTOR
Simeon M. Walcher,
By C. A. Snow & Co.
his Attorneys.

(Model.)

S. M. WALCHER.
WASHING MACHINE.

2 Sheets—Sheet 2.

No. 350,175.  Patented Oct. 5, 1886.

WITNESSES
Percy C. Bowen.
Wm. N. Moore.

INVENTOR
Simeon M. Walcher,
By C. A. Snow & Co.
his Attorneys.

UNITED STATES PATENT OFFICE.

SIMEON M. WALCHER, OF LOUISBURG, KANSAS.

WASHING-MACHINE.

SPECIFICATION forming part of Letters Patent No. 350,175, dated October 5, 1886.

Application filed August 20, 1885. Serial No. 174,900. (Model.)

*To all whom it may concern:*

Be it known that I, SIMEON M. WALCHER, a citizen of the United States, residing at Louisburg, in the county of Miami and State of Kansas, have invented a new and useful Improvement in Washing-Machines, of which the following is a specification, reference being had to the accompanying drawings.

My invention relates to an improvement in washing-machines; and it consists in the peculiar construction and combination of devices, that will be more fully set forth hereinafter, and particularly pointed out in the claims.

Figure 1:
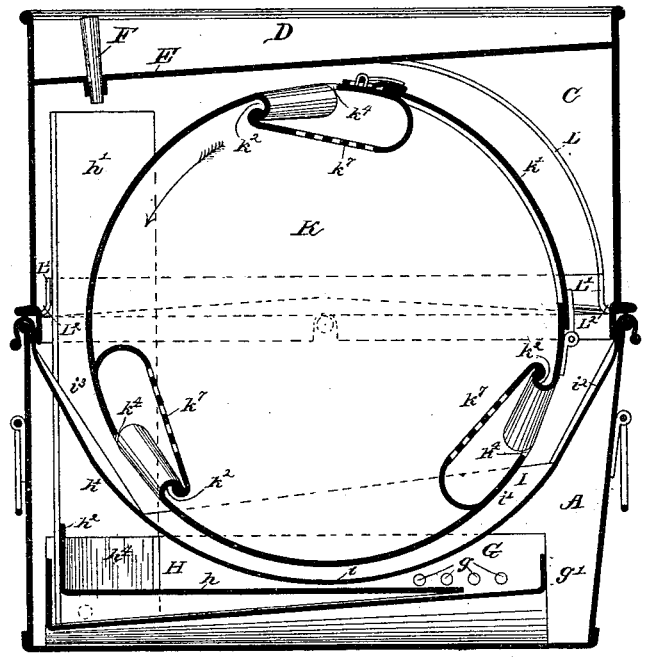
Figure 2:
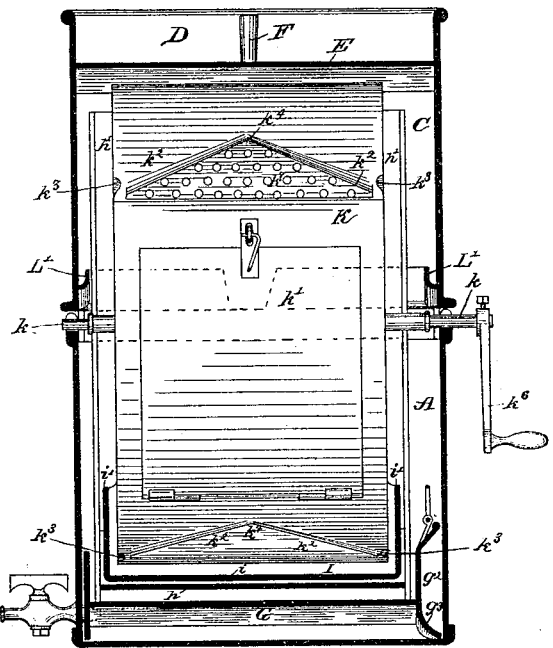
Figure 3:
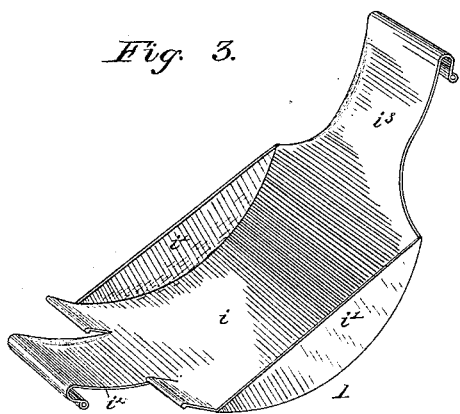
Figure 4:
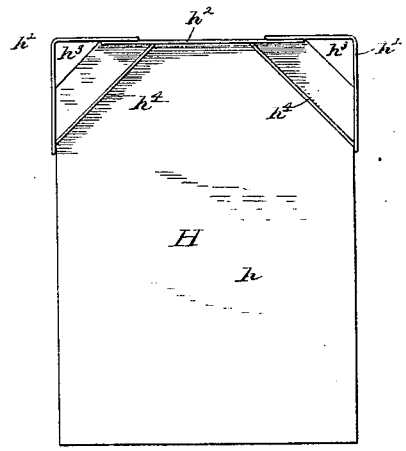

In the accompanying drawings, Figure 1 is a vertical longitudinal sectional view of a washing-machine embodying my invention. Fig. 2 is a transverse sectional view of the same. Fig. 3 is a detailed perspective view of the clear-water pan. Fig. 4 is a top plan view of the cover for the dirt-pan.

A represents a boiler, which is preferably rectangular in shape. This boiler is provided at one end, near the bottom, with a discharge-cock, B. A rectangular cover, C, fits over the boiler, and has on its upper side a reservoir, D, the bottom E of which is inclined. A cock or plug, F, is located at the lower end of the reservoir communicating with the boiler. In the bottom of the boiler is located a pan, G, the bottom of which is inclined, as shown, the lower end of the inclined bottom communicating with the discharge-cock. The pan G is neither as long nor as wide as the boiler, a space, $g'$, being left between the upper end of the pan and the adjacent end of the boiler, and a similar space, $g^2$, being left between one side of the pan and the boiler. From this side of the pan extends an inclined flange, $g^3$, that comes in contact with the side of the boiler, as shown in Fig. 2, and in one side of the pan, near the upper end thereof, are a series of openings, $g$, communicating with the space $g^2$ in the boiler, so as to permit access of water from the dirt-pan to the boiler.

H represents a cover, which consists of the bottom plate, $h$, provided at one end with the vertical angle-plates $h'$, located on opposite corners of the bottom plate. The corners of the bottom plate, in the angle-plates, are cut away so as to leave openings $h^3$ at the lower ends of the angle-plates, and one end of the bottom plate is upturned, as at $h^2$, to form an end wall for the bottom plate between the angle-plates. Vertical diagonal walls $h^4$ connect the end walls, $h^2$, with the outer edges of the angle-plates, as shown.

I represents a clear-water pan having the curved bottom $i$, the sides $i'$, and the suspending-straps $i^2$ and $i^3$. The strap $i^2$ catches over one end of the boiler, and the strap $i^3$, which is longer than strap $i^2$, passes between the vertical angle-plates and catches over the opposite end of the boiler, so as to suspend the clear-water pan therein in an inclined position above the cover H.

K represents a revolving closed cylinder having journals $k$, that bear in openings formed in the upper edge of the boiler. This cylinder has a hinged door, $k'$, and is provided with a series of V-shaped openings, $k^4$, which are equidistant apart. The inclined sides of these openings have conductors or discharges $k^2$, that communicate with the interior of the cylinder and lead to discharge openings $k^3$, that are formed in the sides of the cylinder, as shown. To one of the journals $k$ is attached a crank, $k^6$. The openings $k^4$ are covered by the perforated buckets $k^5$, attached to the inner side of the periphery of the cylinder. From the under side of the inclined bottom E of the cover depend guiding-straps L, that are curved in the form of a quarter-circle, and extend to one of the end walls of the cover. On the inner sides of the side and end walls of the cover, near the lower edges thereof, are located inclined troughs or spouts L', with which the straps L communicate. The function of the said straps and troughs is to conduct the water resulting from the condensation of the steam to openings $L^2$, made in the troughs at the ends of the cover, to discharge the same through said openings onto the suspending-straps of the clear-water pan, and thus conduct the condensed purified water directly to said pan.

The operation of my invention is as follows: Water is poured into the boiler until it reaches the lower end of the clear-water pan, and the boiler is placed on the stove or heater and the water is raised to the boiling-point. The cylinder is about half filled with clothes that have been thoroughly soaped, and the cylinder is then rotated in the direction indicated by the arrow in Fig. 1. The reservoir D has been previously filled with cold water. The lower portion of the cylinder rotates in the clear-water pan, and the water enters said cylinder and passes through the clothes, and the steam strikes upon the inclined bottom of the reservoir, is condensed, and is conducted by the curved straps and the troughs or spouts L' back to the clear-water pan. As the cylinder revolves, the water that has been in contact with the soiled clothes is discharged through the conductors $k^2$ and openings $k^3$ over the lower end of the clear-water pan and downwardly through the openings $h^3$ of the cover H into the lower end of the dirt-pan G. The dirt and sediment in the water settle in the pan G. The bottom plate, $h$, of the cover covers the dirt-pan, as shown, and serves to retain the dirt and sediment therein and prevent it from becoming diffused by the ebullition of the boiling-water. The action of the heat under the inclined bottom of the pan G causes a constant circulation of the water in the boiler. As the soiled water is discharged from the cylinder, its place is supplied by water from the clear-water pan, and as the clear-water pan derives its supply from the condensed steam and purified water the water in it is always pure, and consequently the clothes in the cylinder are subjected to the action of a continual stream of clear water and steam. When this process has been continued a sufficient time—say fifteen minutes—the dirt and water in the pan G are drawn off by the cock B, and a fresh supply of water is slowly admitted to the clear-water pan from the reservoir D, to be passed through the clothes until rinsed sufficiently, after which they are removed from the cylinder, and the process is then repeated on another supply of soiled clothes.

Having thus described my invention, I claim—

1. The cylinder K, having the openings $k^4$, having the inclined sides, conductors $k^2$, arranged on the inclined sides of the openings and communicating with the interior of the cylinder, discharge-openings in the sides of the cylinder communicating with the conductors $k^2$, and perforated bottoms or covers for the openings $k^4$, substantially as described.

2. The combination of the boiler, the clear-water pan suspended or supported therein, and the cylinder journaled in the boiler, the lower side of the cylinder entering the clear-water pan, substantially as described.

3. The combination of the boiler, the rotating clothes-cylinder therein, the condenser, and the clear-water pan for receiving the waters of condensation and supplying the same to the clothes-cylinder, whereby the latter will be supplied with a constant accession of clear, pure water, substantially as described.

4. The combination of the boiler, the rotating cylinder therein, the condenser, the clear-water pan for receiving the waters of condensation and supplying the same to the clothes-cylinder, and the pan to receive the impure water from the clothes-cylinder, substantially as described.

5. The combination of the boiler, the rotating cylinder therein, the dirt-pan for collecting the sediment, the condenser, the clear-water pan for receiving the waters of condensation and supplying the same to the clothes-cylinder, and the cover H for the dirt-pan, to prevent diffusion of the sediment therein, substantially as described.

6. The combination of the boiler having the condensing chamber or reservoir on its top, the cylinder journaled in the boiler, the pan G, located in the bottom of the boiler and having the inclined bottom, the cover H, located in the pan, and the clear-water pan above the said cover, in which the lower side of the cylinder revolves, substantially as described.

7. The combination of the boiler, the rotating cylinder, and the clear-water pan for supplying water to the cylinder, the latter having openings in its periphery to receive the water from the pan, and inclined discharge-conductors for conveying the impure water in the cylinder through the sides of the same over the sides of the clear-water pan as the cylinder rotates, to avoid polluting the water in the clear-water pan, substantially as described.

In testimony that I claim the foregoing as my own I have hereto affixed my signature in presence of two witnesses.

SIMEON M. WALCHER.

Witnesses:
   H. A. WILLIAMS,
   C. D. STEWARD.